United States Patent
Cole (10) Patent No.: US 7,411,998 B1
(45) Date of Patent: Aug. 12, 2008

(54) METHOD AND APPARATUS FOR USING LOW POWER TRAINING

(75) Inventor: Terry L. Cole, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 0 days.

(21) Appl. No.: 09/488,351

(22) Filed: Jan. 20, 2000

Related U.S. Application Data (60) Provisional application No. 60/166,774, filed on Nov. 22, 1999.

(51) Int. Cl.
*H04B 1/38* (2006.01)

(52) U.S. Cl. ..................................... 375/222

(58) Field of Classification Search ................. 375/222, 375/221, 219, 220, 354, 401, 223, 224, 225, 375/226, 227, 228; 370/430, 401, 403; 379/93.08; 455/73; 710/1
See application file for complete search history.

(56) References Cited

U.S. PATENT DOCUMENTS

| | | | | |
|---|---|---|---|---|
| 5,475,711 | A | 12/1995 | Betts et al. | 375/240 |
| 5,870,438 | A * | 2/1999 | Olafsson | 375/344 |
| 5,881,102 | A * | 3/1999 | Samson | 375/222 |
| 5,909,463 | A * | 6/1999 | Johnson et al. | 375/220 |
| 6,163,570 | A * | 12/2000 | Olafsson | 375/223 |
| 6,219,378 | B1 * | 4/2001 | Wu | 375/231 |
| 6,324,268 | B1 * | 11/2001 | Balachandran et al. | 379/93.08 |
| 6,385,203 | B2 * | 5/2002 | McHale et al. | 370/401 |
| 6,434,119 | B1 * | 8/2002 | Wiese et al. | 370/252 |
| 6,438,186 | B1 * | 8/2002 | Strait | 375/354 |
| 6,487,241 | B1 * | 11/2002 | Cole | 375/220 |
| 6,498,808 | B1 * | 12/2002 | Tzannes | 375/225 |
| 6,751,254 | B1 * | 6/2004 | Palm | 375/222 |
| 2002/0181609 | A1 * | 12/2002 | Tzannes | 375/295 |
| 2003/0026282 | A1 * | 2/2003 | Gross et al. | 370/430 |
| 2003/0103559 | A1 * | 6/2003 | Palm | 375/222 |

FOREIGN PATENT DOCUMENTS

| | | |
|---|---|---|
| EP | 0 961 515 A1 | 12/1999 |
| WO | WO 99/59323 | 11/1999 |

OTHER PUBLICATIONS

ITU-T Recommendation G.994.1, Handshake procedures for digital subscriber line transceivers, Jun. 1999, Series G.*

* cited by examiner

*Primary Examiner*—Sam K Ahn
(74) *Attorney, Agent, or Firm*—Williams, Morgan & Amerson, P.C.

(57) ABSTRACT

A method and apparatus are provided. The method includes establishing a communication channel between a first transceiver and a second transceiver in low power mode, and determining a training parameter using the communication channel. The method also includes performing training in response to determining the training parameter. The apparatus, capable of communicating with a transceiver, includes a first and second logic. The first logic is capable of establishing a communication channel with the transceiver in a low power mode. The second logic is capable determining a training parameter using the communication channel, and providing the training parameter to the transceiver.

33 Claims, 5 Drawing Sheets

METHOD AND APPARATUS FOR USING LOW POWER TRAINING

The present application claims priority from U.S. Provisional Application Ser. No. 60/166,774, filed Nov. 22, 1999; the entire contents of which is specifically incorporated herein by reference in its entirety.

BACKGROUND OF THE INVENTION

1. Field of the Invention

This invention relates generally to telecommunications devices, and, more particularly, to a method and apparatus for using low power training in xDSL systems.

2. Description of the Related Art

In communications systems, particularly telephony, it is common practice to transmit signals between a subscriber station and a central switching office via a two-wire, bi-directional communication channel. The Plain Old Telephone System (POTS), designed primarily for voice communication, provides an inadequate data transmission rate for many modern applications. To meet the demand for high-speed communications, designers have sought innovative and cost-effective solutions that take advantage of the existing network infrastructure. Several technological advancements have been proposed in the telecommunications industry that make use of the existing network of telephone wires. One of these technologies is the xDSL technology. DSL technology uses the existing network of telephone lines for broadband communications. An ordinary twisted pair equipped with DSL interfaces can transmit videos, television, and high-speed data.

DSL technologies typically leave the POTS service undisturbed. Traditional analog voice band interfaces use the same frequency band, 0-4 Kilohertz (kHz), as telephone service, thereby preventing concurrent voice and data use. A DSL interface, on the other hand, operates at frequencies above the voice channels from 100 kHz to 1.1 Megahertz (MHz). Thus, a single DSL line is capable of offering simultaneous channels for voice and data.

DSL systems use digital signal processing (DSP) to increase throughput and signal quality through common copper telephone wire. Certain DSL systems provide a downstream data transfer rate from the DSL Point-of-Presence (POP) to the subscriber location at speeds of about 1.5 Megabits per second (MBPS). The transfer rate of 1.5 MBPS, for instance, is fifty times faster than a conventional 28.8 kilobits per second (KBPS) transfer rate.

One popular version of the DSL technology is the Asymmetrical Digital Subscriber Line (ADSL) technology. The ADSL standard is described in ANSI T1.413 Issue 2, entitled, "Interface Between Networks and Customer Installation—Asymmetric Digital Subscriber Line (ADSL) Metallic Interface," the most recent revision of which as of the filing date of this specification is incorporated herein by reference in its entirety.

ADSL modems use two competing modulation schemes: discrete multi-tone (DMT) and carrierless amplitude/phase modulation (CAP). DMT is the standard adopted by the American National Standards Institute. The standard defines 256 discrete tones. Each tone represents a carrier signal that can be modulated with a digital signal for transmitting data. The specific frequency for a given tone is 4.3125 kHz times the tone number. Tones 1-7 are reserved for voice band and guard band (i.e., tone 1 is the voice band and tones 2-7 are guard bands). Data is not transmitted near the voice band to allow for simultaneous voice and data transmission on a single line. The guard band helps isolate the voice band from the ADSL data bands. Typically, a splitter may be used to isolate any voice band signal from the data tones. Tones 8-32 are used to transmit data upstream (i.e., from the user), and tones 33-256 are used to transmit data downstream (i.e., to the user). Alternatively, all the data tones 8-256 may be used for downstream data, and upstream data present on tones 8-32 would be detected using echo cancellation. Because more tones are used for downstream communication than for upstream communication, the transfer is said to be asymmetric.

Through a training procedure, the modems on both sides of the connection sense and analyze which tones are less affected by impairments in the telephone line. Each tone that is accepted is used to carry information. Accordingly, the maximum capacity is set by the quality of the telephone connection. The maximum data rate defined by the ADSL specification, assuming all tones are used, is about 8 MBPS downstream and about 640 KBPS upstream.

Existing xDSL systems rely upon training to determine characteristics of the subscriber line, as well as the characteristics of the transmitter. The subscriber line characteristics include phase and amplitude distortion as well as the shape of the noise. The characteristics of the transmitter include the symbol timing and carrier frequency and phase. Existing xDSL systems typically use a high power mode for training, although a politeness cutback of up to 12 dB may exist in the downstream direction. If the data rate needed is less than the channel capacity available, the difference becomes "excess margin."

Existing communications systems employing high power levels for training, however, have several drawbacks. First, high power level signals introduce cross-talk, and therefore, cause interference in adjacent systems. Second, more than necessary power is expended in performing training. Third, existing systems are less flexible and reliable since the training parameters are typically available only during, and not prior to, the final configuration phase of the communications systems.

The present invention is directed to overcoming, or at least reducing the effects of, one or more of the problems set forth above.

SUMMARY OF THE INVENTION

One aspect of the present invention is seen in a method that includes establishing a communication channel between a first modem second transceiver in low power mode, and determining a training parameter using the communication channel. The method also includes performing training in response to determining the training parameter.

Another aspect of the present invention is seen in an apparatus that includes a first and second logic. The first logic is capable of establishing a communication channel with the transceiver in a low power mode. The second logic is capable determining a training parameter using the communication channel, and providing the training parameter to the transceiver.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
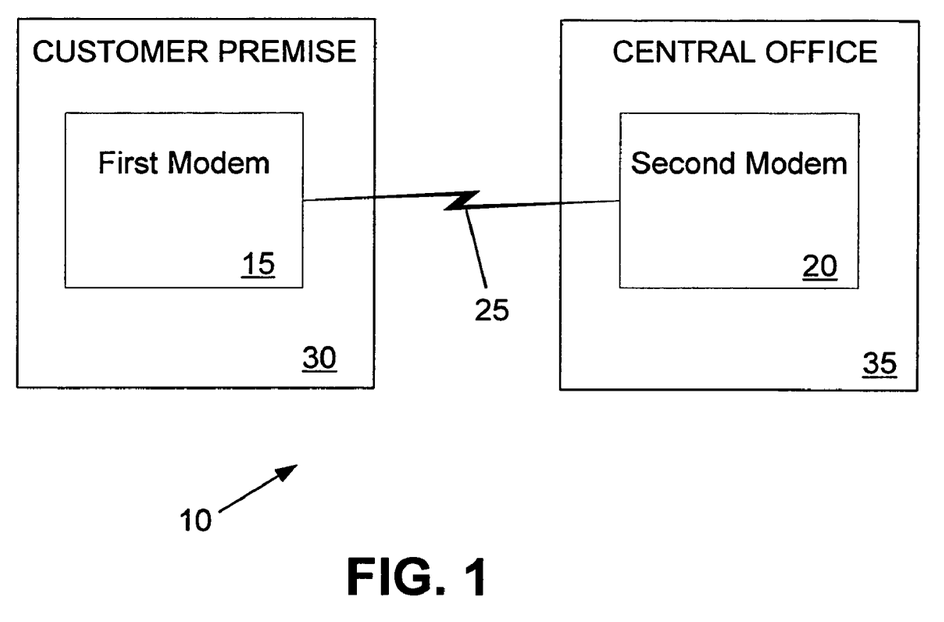
FIG. 1 is a simplified block diagram of a communications system in accordance with the present invention.

Referring to FIG. 1, a block diagram of a communications system 10 is provided. The communications system 10 includes a first modem 15 coupled to a second modem 20 through a connection 25. In the illustrated embodiment, the first modem 15 is located at a customer premise 30, and the second modem 20 is part of a central office 35. The connection 25 is an ordinary twisted pair connection, as is common in present-day telephone networks. However, other connection types (e.g., wireless, cellular, etc.) are contemplated, depending on the specific implementation. Also, it is contemplated that the second modem 20 may not be part of the central office 35, but rather the second modem 20 may be installed in a second customer premise (not shown). For purposes of illustration, the modems 15, 20 are described as they might be implemented under the ADSL protocol (ANSI T1.413). It is contemplated that the techniques described herein may be applied to other communication protocols, depending on the specific implementation. The functions described herein may also be implemented in other communications devices other than modems.

The second modem 20 in one embodiment may be a gateway to a larger communications network (not shown), such as a local or wide area network, or the Internet. Typically, the first modem 15 establishes a connection to the communications network (not shown) through the second modem 20. During the process of establishing the connection, the first and second modems 15 and 20 complete a training process whereby an initial bit loading technique (e.g., water filling, equal energy distribution, etc.) is employed to establish the throughput available for communication between the modems 15, 20.

Although the present invention is described as it may be implemented in a modem, it is contemplated that, in light of this disclosure, the invention may be applied to any type of transceiver, including, but not limited to, a modem or some other wired or wireless communication device.

Figure 2:
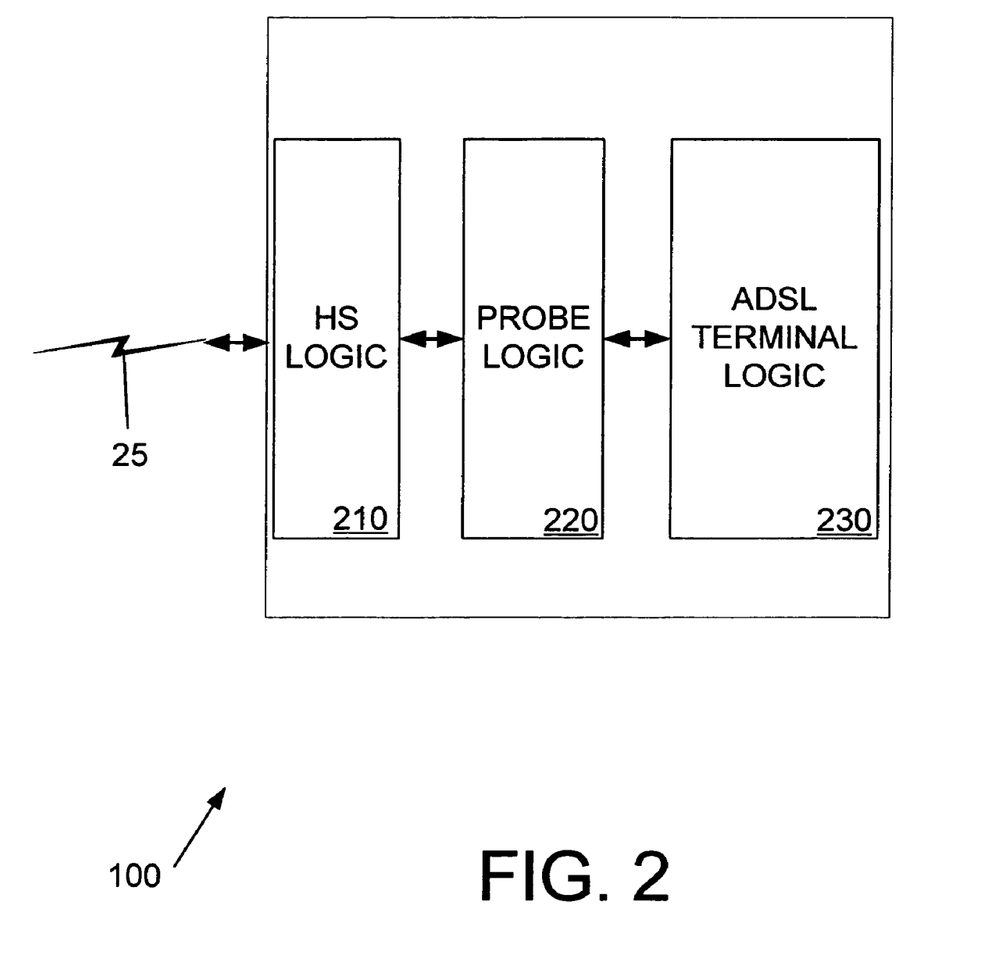
FIG. 2 is a simplified block diagram of a modem in the communications system of FIG. 1.
Figure 3:
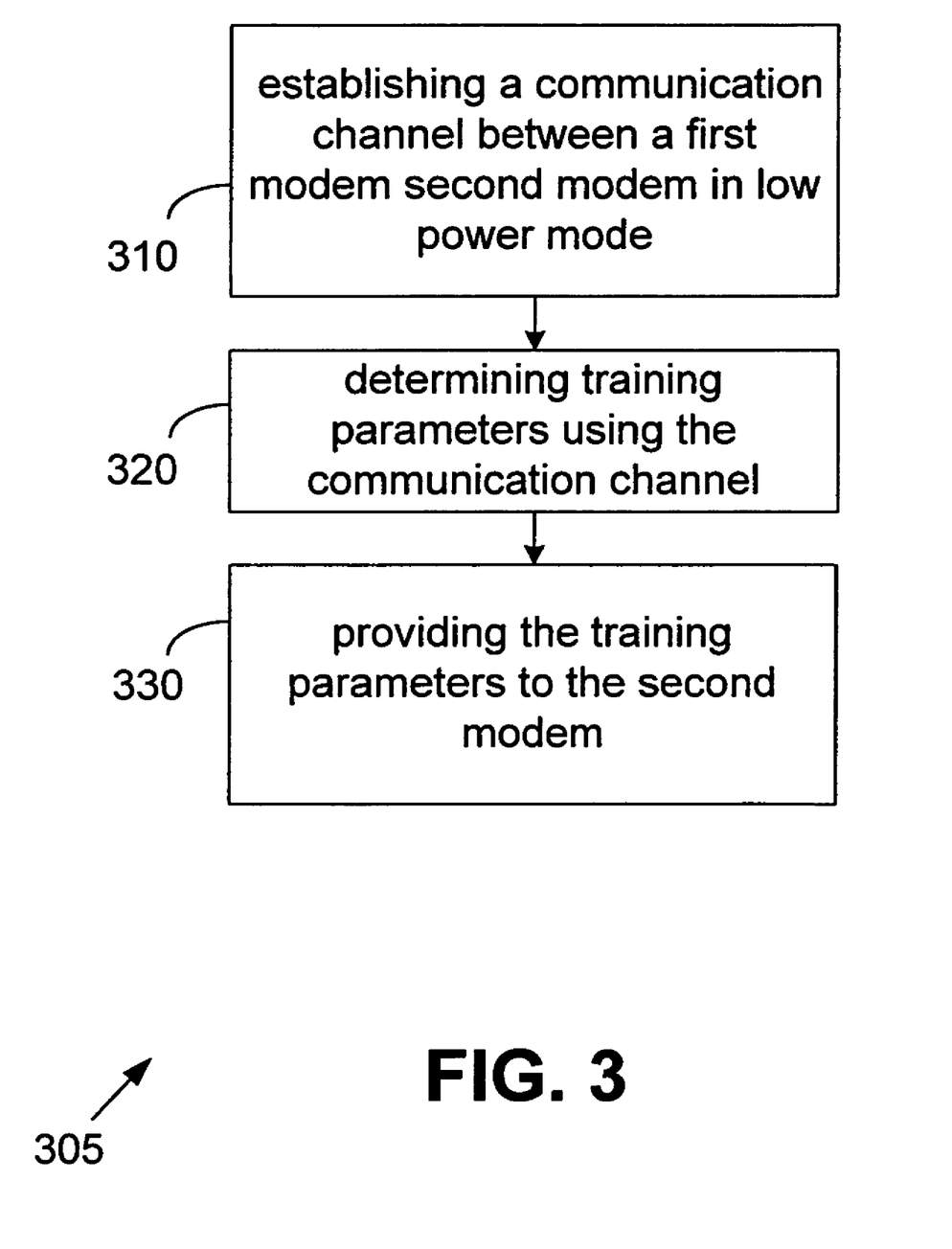
FIG. 3 is a flow diagram of a method in accordance with the present invention that may be employed by the modem of FIG. 2.

Referring to FIGS. 2 and 3, a simplified block diagram of one embodiment of a modem 100 and a method 305 in accordance with the present invention are provided. For the sake of clarity, and to further an understanding of the invention, the method 305 shall be disclosed in the context of the modem 100. However, the invention is not so limited and admits wide variation as is discussed further below.

The modem 100 may be the first modem 15 or the second modem 20, although for illustrative purposes it is assumed that the modem 100 is the second modem 20 located at the central office 35. For clarity and ease of illustration, not all functional blocks are illustrated in detail because these items are known to those of ordinary skill in the art, and are further defined in well-known modem standards.

The modem 100 includes handshake logic 210, probe logic 220, and ADSL terminal logic 230. Although not so limited, the handshake logic 210 in the illustrated embodiment comprises the handshake procedures defined for DSL transceivers, as described in ITU-T Recommendation G.994.1, entitled, "Handshake Procedures for Digital Subscriber Line Transceivers" (hereinafter referred to as the "Handshake Recommendation"). The most recent revision of the Handshake Recommendation as of the filing date of this specification is incorporated herein by reference in its entirety. The Handshake Recommendation defines the signals, messages, and procedures for common start-up procedures for the modem 100.

The handshake logic 210 and probe logic 220 each include a modulator (not shown) for modulating all transmitted signals and demodulator (not shown) for demodulating all received signals. The handshake logic 210, in accordance with the Handshake Recommendation, sends all messages with one or more carrier sets. All carrier frequencies within a carrier set and all carrier sets are simultaneously modulated with the same data bits using Differentially encoded binary Phase Shift Keying (DPSK). A transmit point is rotated 180 degrees from the previous point if a transmit bit is a 1, and the transmit point is rotated 0 degrees from a previous point if the transmit bit is a 0.

Figures 4, 5:
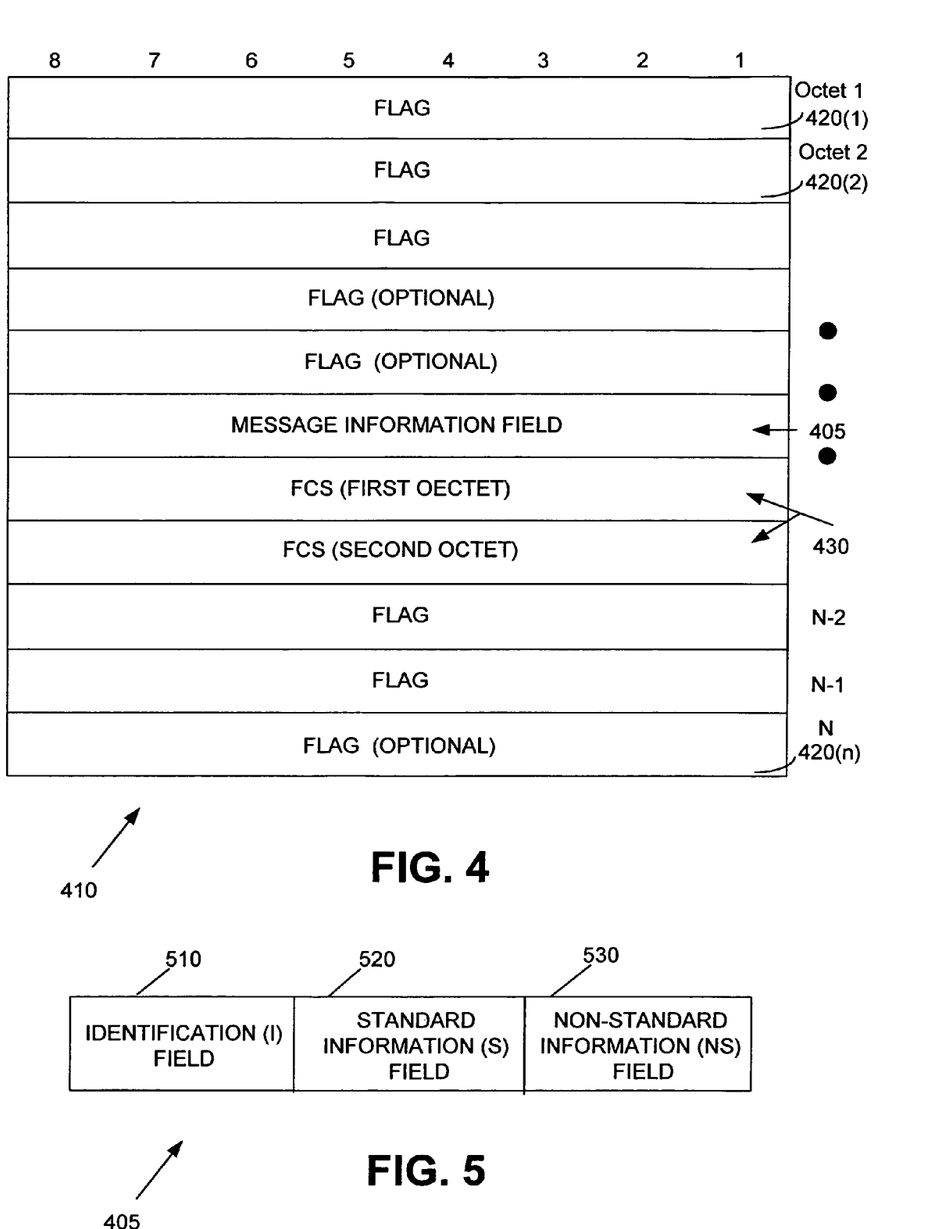
FIG. 4 illustrates a format of a frame that may be utilized in the communications system of FIG. 1 to transmit messages.
FIG. 5 illustrates a format of an information field of the frame FIG. 4.
Figure 6:
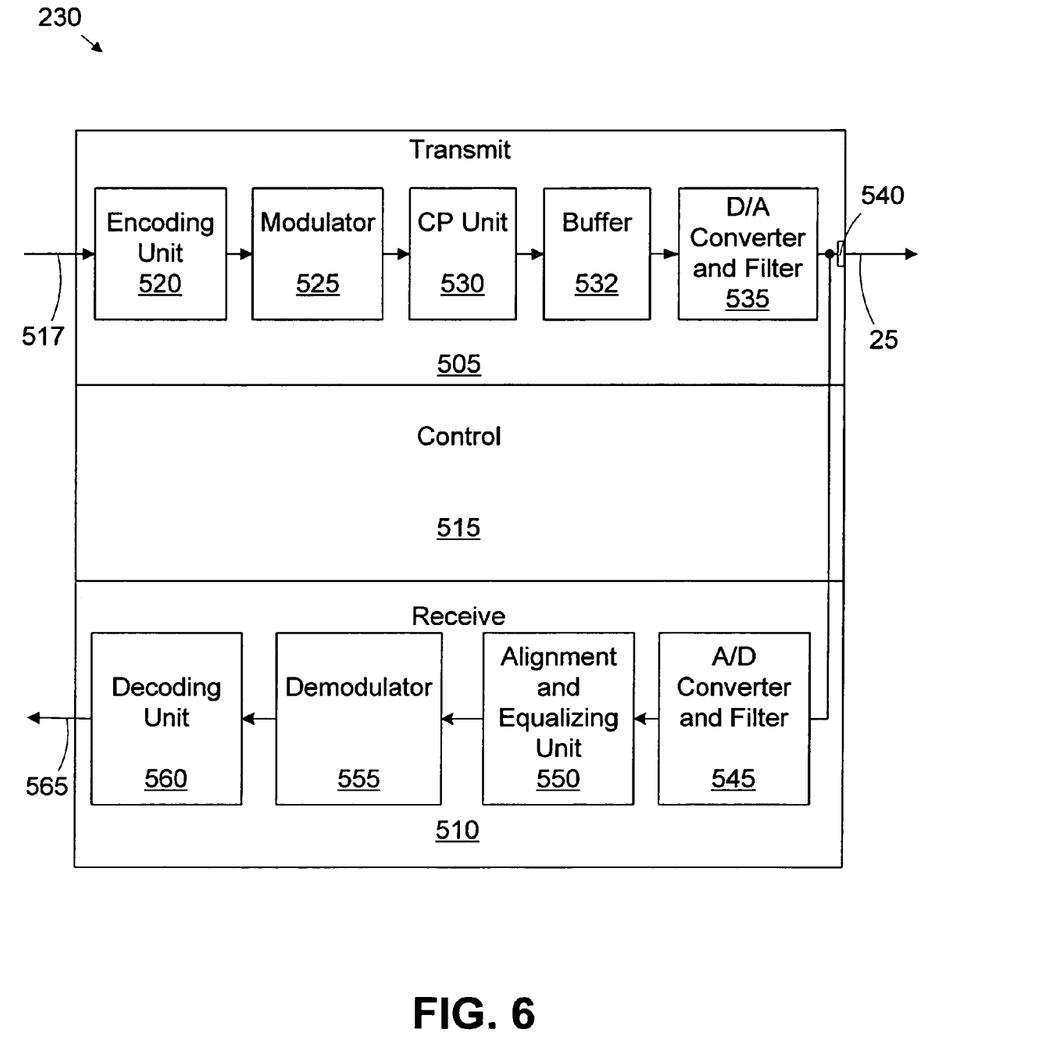
FIG. 6 illustrates an ADSL terminal logic 230 that may be employed in the modem of FIG. 2.

The handshake logic 210 supports messaging between the modem 100 and first modem 15. A message, defined herein as framed information conveyed via modulated transmission, consists of one or more segments. Each segment is encapsulated in an information field 405 of a frame 410, as shown in FIG. 4. FIG. 4 illustrates a structure of the frame 410. The bits are grouped into octets 420(1-n), where the bits of each octet 420(1-n) are shown horizontally and are numbered from 1 to 8. The octets 420(1-n) are displayed vertically and are numbered from 1 to N. The contents of the frame 410 shall consist of an integer number of octets 420(1-n). The octets 420(1-n) are transmitted in ascending numerical order. Within an octet 420(1-n), bit 1 is the first bit to be transmitted.

As shown in FIG. 4, each frame 410 begins and ends with a standard HDLC flag octet (01111110). At least three, but not more than five, flags shall be sent to begin the frame 410. At least two, but not more than three, flags shall follow the frame check sequence (FCS) field 430 of each frame 410. The handshake logic 210 supports error checking via the frame check sequence field 430. The FCS field 430 is 16 bits (2 octets) in length. The Handshake Recommendation describes in more detail an error-checking algorithm that may be employed in the instant invention.

As per the Handshake Recommendation, the message information field 405 consists of three components, an identification field 510, a standard information field 520, and an optional non-standard information field 530, as shown in FIG. 5. The identification field 510 consists of four components: a message type field, a revision number field, a vender ID field, and a bit-encoded parameter field. The purpose of the message type field is to identify the message type of the frame 410, for example, message type mode select (MS) is represented by bit numbers 00000000. The purpose of the revision number field is to identify the revision number of the Handshake Recommendation to which the modem 100 conforms. The Vender ID field identifies the vendor of the modem 100. The bit-encoded parameter field contains parameters that are independent of the mode to be selected and are typically either service or application related. The standard information field 520 is utilized to convey information defined within the Handshake Recommendation, while the non-standard information field 530 is utilized to convey information beyond that defined in the Handshake Recommendation. Generally, in the standard information field 520, the parameters represent modes of working or capabilities relating to the first modem 15 and the modem 100.

The Handshake Recommendation includes a protocol for supporting two types of transactions—basic and extended transactions. Basic transactions, which are pre-defined transactions that are initiated by the first modem 15, may be classified as one of two types: (1) transactions that exchange and negotiate capabilities between the modem 100 and first modem 15; and (2) transactions that select a mode of operation. Examples of basic trans-actions are "transaction A" and "transaction B." In transaction A, the first modem 15 selects a mode of operation and requests the modem 100 transition to the selected mode. When the modem 100 responds with an acknowledgment message, both modems 15, 100 transition to the selected mode. In transaction B, the first modem 15 requests that the modem 100 select the mode of operation. The modem 100 selects the mode by transmitting an MS message. When the first modem 15 responds with an acknowledgment message, both modems 15, 100 transition to the selected mode.

Extended transactions are generally utilized when the modem 100 wishes to control the negotiation procedures. Extended transactions are derived from a concatenation of two basic transactions. An example of an extended transaction is "transaction A:B," in which the first modem 15 selects a mode of operation and requests that the modem 100 transition to the selected mode. However, rather than responding to the MS message with an ACK(1) message as is the case for basic transaction A, the modem 100 responds to the MS message with a REQ-MR message requesting the first modem 15 to proceed directly into basic trans-action B.

The method 305 of FIG. 3 may be employed by the modem 100 to establish the politeness cutback level. The method 305 begins at block 310, where the handshake logic 210, in conjunction with the probe logic 220, establishes a communication channel with the first modem 15 via the connection 25. The communication channel may include error detection capability and error correction capability for a more reliable connection. In one embodiment the error checking algorithm described in the Handshake Recommendation may be employed in the instant invention. Although the Handshake Recommendation describes no error correction algorithm, such a feature can be readily integrated with the described error-checking algorithm.

In one embodiment, the communication channel is established in a low power mode, which may entail cutbacks on the order of 0-30 dB, especially on shorter loops. Although not so limited, the low power mode may be a communications channel that is established using the smallest amount of power acceptable, which may be established through a variety of methods. In one instance, "acceptable" power refers to a power level that is adequate for establishing a reliable communication channel with the first modem 15. One method for establishing the communication channel using the smallest amount of power acceptable is based on priori estimates, where one or more previously stored power levels could be utilized to ascertain the minimum power required. That is, the modem 100 initiates communication with the first modem 15 using a power level that was utilized during an earlier connection. Alternatively, the minimum acceptable power may be determined by iteratively increasing the power until the communication channel is established. In one embodiment, the probe logic 220 initiates a transaction with the first modem 15 to determine the minimum acceptable power. That is, the modem 100 may send a message to the first modem 15 at a first selected power level, and then wait for an acknowledgment from the first modem 15 to verify that the message successfully reached its destination. A bad or no acknowledgment indicates that a higher power level is needed. The power level at the modem 100 of the signal is increased iteratively until an affirmative acknowledgment is received from the first modem 15. The transaction initiated to determine minimum acceptable power in one embodiment may be an extended transaction since it is initiated by the modem 100 located at the central office 35.

At block 320, the probe logic 220 determines training parameters using the communication channel. The training parameters may include line characteristics of the connection (e.g., a subscriber line) 25 and/or characteristics of a transmitter (not shown) of the first modem 15. In one embodiment, the probe logic 220 determines the line characteristics of the connection 25, where the line characteristics include phase and amplitude distortion, as well as the shape of the noise on the connection. In an alternative embodiment, the probe logic 220, in addition to the line characteristics, also determines the characteristics of a transmitter (not shown) of the first modem 15. The characteristics of the transmitter of the first modem 15 may include symbol timing, carrier frequency, and/or carrier phase.

At block 330, in one embodiment, the probe logic 220 of the modem 100 provides the training parameters to the first modem 15. In an alternative embodiment, the probe logic 220 may not provide the training parameters to the first modem 15, and, instead, may use the training parameters to complete its own training. The information to the first modem 15 may be provided by the modem 100 in the standard information field 520 of the frame 410 if such a message were defined as part of the Handshake Recommendation; if not, it may be transmitted in the non-standard information field 530. It is also possible for the first modem 100 to utilize the method 305 to perform training in a low power mode. In such a case, both modems 15, 100 may exchange information, such as training parameters, via either the standard information field 520 and/or the non-standard information field 530.

Upon exchanging training parameters, the probe logic 220 can compare the data capacity needed to the communication channel capacity available. Any access can be translated into excess margin, reduced power, or reduced interference through other means, such as coding, spreading, spectral shaping, and the like. Excess noise margin may include some additional signal-to-noise ratio that is set aside and not used to increase the speed of the connection. Thus, excess margin increases immunity to noise if the noise on the line gets worse.

Excess margin also allows for a faster connection if needed, or it can allow for reduced power, if desired. A reduction in power may result in reduced power consumption in the digital signal processor (not shown) of the modem 15, or in the memory (not shown) of the modem 15, or in other portions of the modem 15. A reduced power often translates into less heat, less cooling, less space needed for power supplies, and the like. Reduced interference increases the signal-to-noise ratio in the crosstalk power sum, if power is reduced in adjacent wires.

After training, the ADSL terminal logic 230 initiates a training procedure with the first modem 15 and proceeds to exchange data. The ADSL terminal logic 230 includes transmit, receive, and control functional blocks 505, 510, 515, as shown in FIG. 5. The transmit block 505 includes an encoding unit 520 adapted to receive outgoing digital data over a data-out line 517. The encoding unit 520 performs functions such as cyclic redundancy checking (CRC), scrambling, forward error correction, and interleaving. As stated above, these functions are known to those of ordinary skill in the art.

The data in binary form is grouped into sets referred to as frames. A plurality of frames (i.e., 68 in the illustrated embodiment) is referred to as a superframe. The transmit block 505 also includes a modulator 525 that receives the data frames from the encoding unit 520 and modulates a carrier or carriers with the data. The modulator 525 performs tone ordering, constellation encoding, gain scaling, and an inverse discrete Fourier transform (IDFT) function to provide time domain waveform samples. The set of time domain waveform samples corresponding to a frame of data is referred to as a symbol. A cyclic prefix (CP) unit 530 performs cyclic prefix insertion (i.e., a subset of the output samples from the modulator 525 is replicated and prepended to the existing output samples to provide an overlap and allow for better symbol alignment). A buffer 532 stores the samples received from the CP unit 530. A digital to analog (D/A) converter and filter 535 converts the samples from the CP unit 530 to an analog waveform suitable for transmission over the connection 25 through an external line interface 540.

The receive block 510 includes an analog to digital (A/D) converter and filter 545 that receives an analog waveform over the connection 25 and samples the analog waveform to generate a time domain digital signal. An alignment and equalizing unit 550 performs functions known in the art, such as symbol alignment and time domain equalization. In time domain equalization, because the tones are at different frequencies, certain frequencies travel faster than others, and as such, all the tones do not arrive at the same time. The time domain equalization function of the alignment and equalizing unit 550 delays the faster tones to compensate for the propagation speed differences. There is a performance trade-off between the symbol alignment and time domain equalization functions in that a higher degree of symbol alignment accuracy allows a lesser degree of accuracy in time domain equalization. Cyclic prefix insertion improves symbol alignment accuracy. The alignment and equalizing unit 550 also performs gain control to increase the amplitude of the received signal.

A demodulator 555 receives the time domain samples from the alignment and equalizing unit 550 and converts the time domain data to frequency domain data. The demodulator 555 performs a slicing function to determine constellation points from the constellation encoded data, a demapping function to map the identified constellation points back to bits, and a decoding function (e.g., Viterbi decoding if trellis constellation coding is employed). In the case where the modem operates using the ADSL protocol, the demodulator 555 also performs tone deordering to reassemble the bytes that were divided among the available tones. A decoding unit 560 in the receive block 510 performs forward error correction, CRC checking, and descrambling functions on the data received from the demodulator 555. The reconstructed data provided by the decoding unit 560 represents the sequential binary data that was sent by the first modem 15, the interfacing modem. The reconstructed data is provided to a data-in line 565.

Although FIG. 2 illustrates probe logic 220 as a separate block, it is envisioned that the functionality of the probe logic 220 may be integrated as part of the handshake logic 210, or, alternatively, as part of the ADSL terminal logic 230, without deviating from the spirit and scope of the present invention. Moreover, in one embodiment, the ADSL terminal logic 230 controls (i.e., initiates/terminates) the functions performed by the probe and handshake logic 210. That is, during startup, the ADSL terminal logic 230 first calls the handshake logic 210 and probe logic 220 to perform the training in the low power mode, and then proceeds to exchange data with the first modem 15.

The present invention offers several advantages in that it offers an efficient, effective, and reliable means for performing training in a low power mode. First, using a lower power mode, as opposed to the high power mode traditionally utilized in existing xDSL systems, reduces the cross-talk, and therefore, reduces interference in adjacent systems. Second, power is conserved during training, since training is accomplished in a lower power mode. Third, the instant invention allows training parameters to be determined prior to final configuration of the modem 100, which makes the modem 100 more flexible and reliable.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method comprising:
   establishing a communication channel between a first transceiver and a second transceiver in low power mode;
   determining, at the first transceiver, a training parameter in response to establishing the communication channel in the low power mode;
   performing training, at the first transceiver, based at least on the training parameter; and
   providing the training parameter that is used in training of the first transceiver to the second transceiver.

2. The method of claim 1, wherein establishing the channel includes establishing the channel with the smallest amount of power acceptable.

3. The method of claim 1, wherein the low power mode includes a cutback in the range of 0-30 dB.

4. The method of claim 1, wherein determining the training parameter includes determining a phase distortion of the communication channel.

5. The method of claim 1, wherein determining the training parameter includes determining an amplitude distortion of the communication channel.

6. The method of claim 1, wherein determining the training parameter includes determining a transmitter characteristic of the second transceiver using the communication channel.

7. The method of claim 6, wherein the transmitter characteristic of the second transceiver includes determining a symbol timing of the transmitter.

8. The method of claim 6, wherein the transmitter characteristic of the second transceiver includes determining a carrier frequency of the transmitter.

9. The method of claim 6, wherein the transmitter characteristic of the second transceiver includes determining a carrier phase of the transmitter.

10. The method of claim 1, further including providing a training parameter to the first transceiver by the second transceiver.

11. The method of claim 1, wherein establishing the communication channel in the low power mode comprises iteratively increasing a power level between the first and second transceiver until a successful connection is established.

12. The method of claim 1, wherein establishing the communication channel in the low power mode comprises selecting a power level based on previously stored priori power level estimates.

13. An apparatus for communicating with a transceiver, comprising:
   a first logic being capable of establishing a communication channel with the transceiver in a low power mode; and
   a second logic being capable of
      determining a training parameter in response to establishing the communication channel in the low power mode;
      performing training based at least on the training parameter; and
      providing the training parameter that is used in training to the transceiver.

14. The apparatus of claim 13, further including a third logic being capable of transmitting and receiving data with the transceiver.

15. The apparatus of claim 14, wherein the first logic is capable of establishing the channel with the smallest amount of power acceptable.

16. The apparatus of claim 14, wherein the low power mode includes a cutback in the range of 0-30 dB.

17. The apparatus of claim 14, wherein the second logic being capable of determining the training parameter includes the second logic being capable of determining a phase distortion of the communication channel.

18. The apparatus of claim 17, wherein the second logic being capable of determining the training parameter includes the second logic being capable of determining an amplitude distortion of the communication channel.

19. The apparatus of claim 18, wherein the second logic being capable of determining the training parameter includes the second logic being capable of determining a transmitter characteristic of the second transceiver using the communication channel.

20. The apparatus of claim 19, wherein the transmitter characteristic of the second transceiver includes determining a carrier frequency of the transmitter.

21. The apparatus of claim 20, wherein the transmitter characteristic of the second transceiver includes determining a carrier phase of the transmitter.

22. The apparatus of claim 13, wherein the second logic is adapted to at least one of iteratively increase a power level until a successful connection is established with a remote receiver and selecting a power level based on previously stored priori power level estimates.

23. The apparatus of claim 13, wherein the transceiver provides a training parameter to the first logic.

24. A system, comprising:
   a first transceiver; and
   a second transceiver capable of establishing a communication channel with the first transceiver in a low power mode;
      determining the training parameter in response to establishing the communication channel in the low power mode;
      performing training, at the second transceiver, based at least on the training parameter; and
      providing the training parameter that is used in training of the second transceiver to the first transceiver.

25. The system of claim 24, wherein the first transceiver is a DSL modem.

26. The system of claim 25, wherein the second transceiver is a DSL modem.

27. The system of claim 26, wherein the second transceiver is capable of establishing the channel with the smallest amount of power acceptable.

28. The system of claim 26, wherein the second transceiver being capable of determining the training parameter includes the second transceiver being capable of determining at least one of phase distortion and amplitude distortion of the communication channel.

29. The system of claim 28, wherein the second transceiver being capable of determining the training parameter includes the second transceiver being capable of determining a transmitter characteristic of the second transceiver using the communication channel.

30. The system of claim 29, wherein the transmitter characteristic of the first transceiver includes determining at least one of carrier frequency, carrier phase, and symbol timing of the transmitter.

31. The system of claim 24, wherein the second transceiver is adapted to at least one of iteratively increase a power level until a successful connection is established with a remote transceiver and selecting a power level based on previously stored priori power level estimates.

32. The system of claim 24, wherein the first transceiver provides a training parameter to the second transceiver.

33. An apparatus, comprising:
   means for establishing a communication channel between a first transceiver and a second transceiver in low power mode;
   means for determining training parameters in response to establishing the communication channel in the low power mode;
   means for performing training, at the first transceiver, based at least on the training parameter; and
   means for providing the training parameters to the second transceiver.

* * * * *